Sept. 22, 1959     G. A. McMULLEN     2,905,504
CLEAR VISION WINDSHIELD ATTACHMENT FOR VEHICLES
Filed Feb. 24, 1958
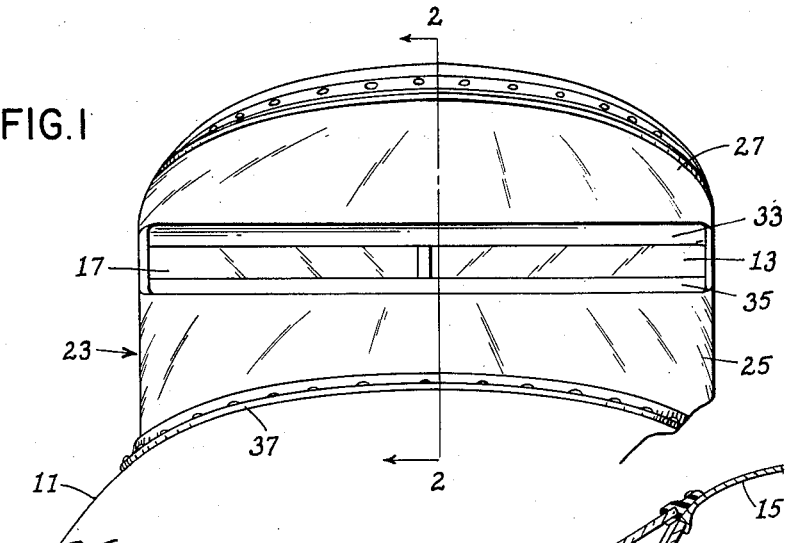
FIG.1
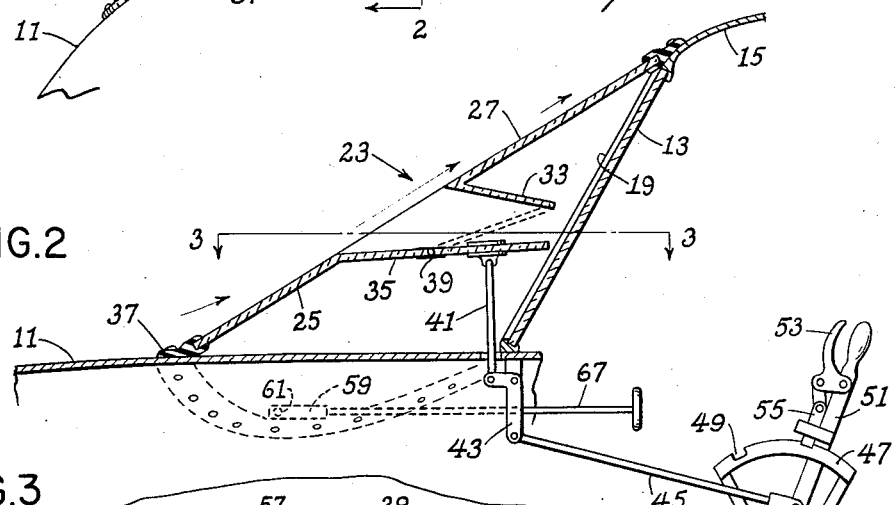
FIG.2
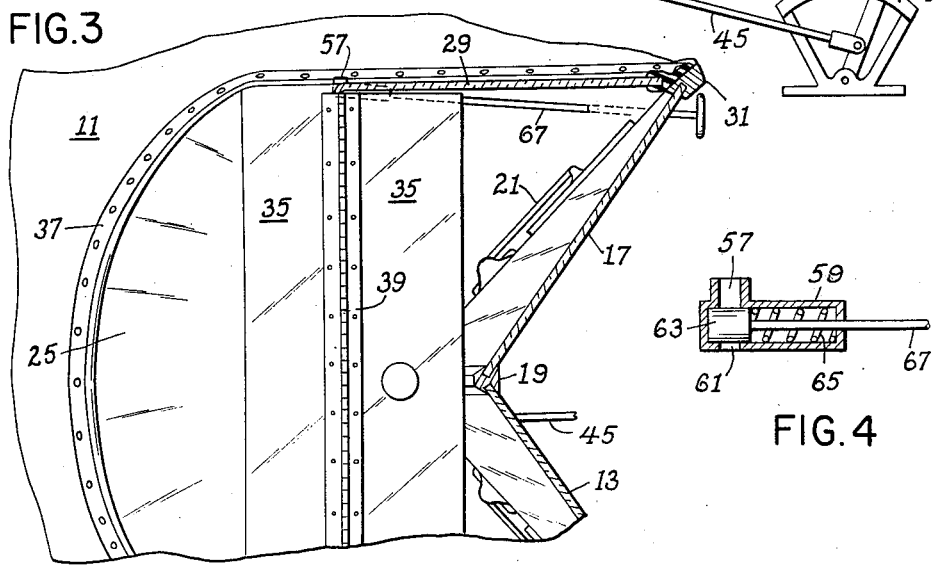
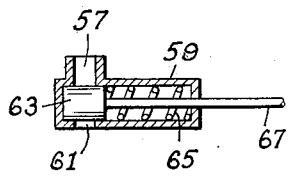
FIG.3
FIG.4

United States Patent Office 2,905,504
Patented Sept. 22, 1959

2,905,504

CLEAR VISION WINDSHIELD ATTACHMENT
FOR VEHICLES

George A. McMullen, Rochester, N.Y.

Application February 24, 1958, Serial No. 717,000

6 Claims. (Cl. 296—95)

The present invention relates to auxiliary windshields and, more particularly, to a windshield attachment for vehicles for providing clear vision during inclement weather.

The auxiliary windshield according to the present invention is especially suitable for airplanes and provides clear vision for the pilot during rain, snow, and sleet storms, particularly while landing.

An object of this invention is to provide a new and improved auxiliary windshield for vehicles for providing clear vision during rain, snow, and sleet storms.

Another object of this invention is to provide a new and improved windshield attachment for airplanes for providing clear vision during inclement weather while in flight and especially while landing.

Yet another object of this invention is to provide a new and improved clear vision auxiliary windshield for vehicles which may be attached to the vehicle permanently or which may be removable so that it may be readily attached to the vehicle when stormy weather threatens.

A further object of this invention is to provide a new and improved windshield attachment for providing clear vision under all weather conditions and which may be easily and inexpensively manufactured.

These and other desirable objects may be attained in the manner disclosed as an illustrative embodiment of the invention in the following description and in the accompanying drawings forming a part hereof, in which:

Fig. 1 is a front view of the auxiliary windshield according to the present invention shown as applied to the main windshield of an airplane, portions of the cockpit and nose of the airplane being shown;

Fig. 2 is a section of the auxiliary windshield and airplane of Fig. 1 taken approximately on the line 2—2 thereof;

Fig. 3 is a fragmentary section of the auxiliary windshield and airplane of Fig. 2 taken approximately on the line 3—3 thereof; and Fig. 4 is an enlarged section of the water drain shown in Fig. 2.

The same reference numerals throughout the several views indicate the same parts.

During severe stormy weather, the vision of the driver of a moving vehicle is often impaired because the deposit of rain, snow, or sleet on the windshield is frequently so heavy that the conventional windshield wiper cannot remove it fast enough. Occasionally the wiper becomes clogged and stops completely. This problem is especially acute in an airplane, where the speeds are high and the accumulation of rain, snow, or sleet on the windshield is very heavy. Under such conditions, the vision of a pilot may be impaired quite easily. While impaired vision may not be troublesome under some flight conditions, the problem of a clogged windshield does become acute while landing, when the maintenance of clear vision becomes imperative. The preferred embodiment of the present invention is described and illustrated as applied to the main windshield of an airplane, although it is to be understood that the principles of the invention are equally applicable to an automobile, bus, or truck, and other land, sea, and air vehicles.

Referring to the drawing, Figs. 1 to 3, an auxiliary windshield according to the present invention is illustrated as applied to the main windshield of an airplane. The airplane conventionally includes the upper rounded nose member 11 extending generally horizontally and from which rises obliquely upwardly and rearwardly a pane 13 of the main windshield, the roof 15 of the cockpit extending rearwardly from the top edge of this pane. The windshield includes the pane 13 and a similar pane 17, both of which extend rearwardly and outwardly from a center post 19 in the form of a broadened V. The windshield may include other panes extending rearwardly from the panes 13 and 17, however the auxiliary windshield of the preferred embodiment is intended to be applied only to the frontmost two panes. A windshield wiper 21 operates in a conventional manner on the pane 17, and a similar wiper is associated with the pane 13.

The auxiliary windshield is indicated generally at 23 and includes a lower straight front member 25 and an upper straight front member 27 extending transversely across and in front of the panes 13 and 17, the lower edge of the member 25 being connected to the nose 11 of the plane and the upper edge of the member 27 being connected to the cockpit roof 15. The two members 25 and 27 are generally in the same plane and extend obliquely upwardly and rearwardly from the nose 11 of the airplane. At their side edges, the members 25 and 27 are integral with a pair of upstanding side wall members 29, only one of these members being shown in Fig. 3. Of course, the side members 29 may, if desired, be separate members secured to the front members 25 and 27 in substantially air-tight fashion. The side members 29 are generally triangular pieces having the members 25 and 27 fixed to the front edges. The rear edges of the members 29 are connected to upstanding cockpit members 31, and the bottom edges of the members 29 are connected to the nose 11.

Extending rearwardly from the lower edge of the front member 27 is a flange 33, this flange terminating short of the windshield center post 19 and being located so as not to interfere with the action of the windshield wipers 21. Extending upwardly and rearwardly from the upper edge of the lower front member 25 is a lower flange 35, the inner edge of this flange likewise being spaced from the center post 19 so as not to interfere with the action of the wipers 21. Both flanges 33 and 35 are supported by the side members 29 and integral with them and the front members, although they may, if desired, be separate members connected to the front and side members by substantially air-tight joints.

The component parts of the auxiliary windshield 23, that is the front upper and lower members 27 and 25, the side members 29 and the upper and lower flanges 33 and 35, are all made of a rigid transparent material such as safety glass, plastic sheeting, or some other suitable rigid transparent material. For a reason to be explained in greater detail hereafter, the windshield is connected to the airplane by a mounting strip which completely circles the edge of the windshield in one piece, as shown, or several separate but adjacent pieces and is reasonably air-tight. Thus the lower edge of the lower front member 25 is curved to conform to the curvature of the nose 11 and is secured to the nose 11 by a mounting strip 37. Any suitable mounting strip may be used, but as illustrated the mounting strip 37 has a bifurcated portion extending at an angle to its base for receiving the edge of the member 25 and is desirably cemented thereto or otherwise engaged in reasonably air-tight fashion. The base of the strip 37 may be permanently secured to the nose 11 by rivets or the like, or else may be removably secured in place by any appropriate removable fastener. In similar fashion, the upper edge of the upper front member 27 is curved to conform to the curvature of the cockpit 15 and is secured in place by a mounting strip similar to the mounting strip 37 previously described. Likewise, the lower edge of the side members 29 are secured to the nose 11 by a mounting strip 37, and the rear edges of the members 29 are secured in the same manner to the upstanding cockpit members 31. If desired, a gasket or packing or the like may be inserted between the base of each of the mounting strips 37 and the airplane parts to thereby provide a more air-tight connection.

The angle of the front members 25 and 27 relative to the nose 11 is desirably chosen such that the stream of air as indicated by the arrows in Fig. 2 flows smoothly from the nose 11 and up past the members 25 and 27. With the airplane in flight, the flow of air over the members 25 and 27 is rapid and tends to carry it with any rain, snow, or sleet that may impinge upon these members. The lower flange 35 is angled upwardly and rearwardly from the horizontal so that any rain, snow, or sleet accumulating on it, will tend to drain out the front.

Preferably the upper flange 33 is angled downwardly and rearwardly from the horizontal so that the clear vision gap between the two flanges increases in depth from the rear to the front of the auxiliary windshield 23. The rearmost edges of the two flanges, when the auxiliary windshield is in use, are separated by a suitable distance so that the pilot may aline his eyes with the clear vision gap and see through it even during stormy weather.

Desirably the lower flange 35 is divided by a transversely extending hinge 39, the rear portion of the flange thus being adjustable between an open position approximately in the plane of the front portion of the flange and a closed position wherein its rear edge abuts the rear edge of the upper flange 33. This adjustment is provided so that the clear vision gap may be closed when the airplane is at rest to prevent rain or the like from coming in beyond the rear edge of the flange 35 and accumulating between the nose 11 and the auxiliary windshield. Any suitable device may be used to provide this adjustment. As shown, a rod 41 is pivoted at one end to a fixture fastened to the rear portion of the flange 35, the other end of the rod 41 being pivoted on a bellcrank 43 fastened at some appropriate place within the cockpit. The other arm of the bellcrank 43 is pivoted to a rod 45 which is movable by some appropriate means between a closed and an open position corresponding to the position of the rear portion of the flange 35. As shown, an arcuate sector 47 is provided having a pair of spaced notches 49 corresponding to the opened and closed positions of the rear portion. The sector 47 is supported on a base to which is pivoted a radially extending arm 51. Slidable longitudinally along the arm 51 by means of a handle mechanism 53 is a locking plunger 55 which is movable into and out of the notches 49 by proper manipulation of the handle 53. The rear end of the rod 45 is pivotally connected to a lower portion of the arm 51, it being obvious that movement of the arm 51 between its two positions rocks the bellcrank 43 to raise and lower the rod 41 and the rear flange portion secured to it.

In the use of the device, some water may accumulate on the nose 11 below the flange 35. Desirably a valve is provided at each side of the windshield to drain out this excess water when the need arises. To this end, referring to Figs. 2 and 3, wherein only one of the valves is shown, and also to Fig. 4, an aperture 57 is provided in a side member 29, this aperture being in communication with a cylindrical plunger housing 59. The housing 59 is provided with a pair of alined apertures 61 normally blocked by a plunger 63 which is urged to blocking position by a spring 65. The plunger 63 may be retracted by means of a plunger rod 67 extending through the cockpit to a position where it may be operated by the pilot of the plane. Water accumulated on the nose 11 may then drain through the apertures 61 and 57 to the outside of the plane.

In operation, the auxiliary windshield 23 is secured to the nose and cockpit of an airplane as heretofore described, either permanently or removably. In flight, the rear portion of the lower flange 35 is adjusted so as to be approximately in the plane of the front portion of the flange, whereby the clear vision gap between the flanges 35 and 33 is open. A pilot sitting in the cockpit behind the panes 13 and 17 may see through the entire auxiliary windshield 23 inasmuch as it is made of same transparent material. During stormy weather, the slip stream of air coming over the nose 11 is directed upwardly by the lower front member 25 and continues upwardly past the upper front member 27 carrying with it any rain, snow, or sleet that would have impinged upon the two members. The flow of air continuing inwardly between the flanges 33 and 35 compacts or compresses the air underneath the auxiliary windshield device. Because of this compaction, there is subsequently very little flow of air between the two flanges. Consequently, very little rain, sleet, or snow comes through the clear vision gap to the windshield panes 13 and 17. Whatever moisture does accumulate on the windshield is easily wiped away by the action of the windshield pipers 21.

As heretofore explained, rain will drain downwardly off of the lower flange 35 because of its oblique upward position. If snow or sleet should cling to the flanges 35 and 33, this will be a relatively small amount and there will still be a considerable clear vision gap between the ends of the two flanges. During stormy weather, the pilot positions his eyes in alinement with the clear vision gap, and he will have a line of sight even though the lower and upper front members 25 and 27 are obstructed. In the event that water accumulates on the nose 11 below the auxiliary windshield, the plunger rod 67 may be actuated to drain out this excess water.

The auxiliary windshield 23 is especially useful in aircraft when landing, at which time it is absolutely necessary to have good unobstructed vision. The gap between the flanges 33 and 35 is always open, so that the pilot may see his way through to make a good landing.

The auxiliary windshield 23 may be used on land and sea vehicles as well as aircraft. For use on cars, buses, and trucks, the attachment may be fitted to the vehicle so as to be reasonably air-tight at its edges in order to allow the compression of the air within it. Of course, the compression of the air will not be as great as is the case when used with an airplane, but this is counterbalanced by the fact that these vehicles operate at lower speeds and the rain, snow, or sleet is tended to be driven into the clear vision gap with less force. The same holds true of seacraft.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A clear vision auxiliary windshield adapted to be disposed in air-tight relationship on a vehicle in front of the entire main windshield thereof, said auxiliary windshield comprising transversely extending upper and lower front planar members rising upwardly and rearwardly in front of the main windshield and separated to provide a gap, a pair of side members each connected to the side edges of said front members, and an upper and lower flange each connected to the edges of said front members providing said gap, said flanges converging rearwardly and terminating short of the main windshield, said members and flanges being made of a rigid transparent material and having air-tight joints, whereby air entering said gap is compressed to substantially prevent rain and the like from reaching the main windshield when the vehicle is in motion.

2. A clear vision auxiliary windshield comprising obliquely disposed rearwardly and upwardly extending upper and lower front planar members separated to provide a gap, a pair of planar side members connected to the side edges of said front members, an upper and a lower rearwardly extending planar flange each connected to one of said front members at an edge providing said gap, said flanges converging rearwardly and being separated at their rearmost portions, said members and flanges being of a rigid transparent material and having air-tight joints, said auxiliary windshield being adapted to be disposed in air-tight relationship on a vehicle adjacent an entire windshield thereof with said flanges spaced from the windshield.

3. A construction as defined in claim 2, wherein said lower flange is hinged intermediate its length.

4. A construction as defined in claim 2, wherein said lower flange is hinged intermediate its length, and means for moving the rear portion of said lower flange between a position substantially planar with the front portion of said lower flange and a position in contact with said upper flange.

5. A clear vision auxiliary windshield adapted to be disposed in air-tight relationship on a vehicle in front of a substantial portion of the main windshield thereof, said auxiliary windshield comprising an upper and a lower front member rising obliquely upwardly and rearwardly in front of the main windshield and separated to provide a centrally located gap, a pair of side members each connected to the side edges of said front members, and a flange extending rearwardly from each of said front members at the edges providing said gap and terminating short of the main windshield, whereby air entering said gap is compressed to substantially prevent rain, snow, or the like from reaching the main windshield when the vehicle is in motion.

6. A clear vision auxiliary windshield adapted to be disposed in air-tight relationship on a vehicle having a curved cowl in front of a substantial portion of the main windshield thereof, said auxiliary windshield comprising a transversely extending upper and a lower front member disposed substantially in the same plane and rising obliquely upwardly and rearwardly in front of the main windshield and separated to provide a gap, both of said upper and lower front members being transparent and the lower edge of said lower front member being curved to fit the cowl, a pair of side members each connected to the side edges of said front members, and a pair of rearwardly converging flanges connected to said front members at the edges providing said gap and terminating short of the main windshield, whereby air entering said gap is compressed to substantially prevent rain, snow, and the like from reaching the main windshield when the vehicle is in motion.

References Cited in the file of this patent

UNITED STATES PATENTS

| | | |
|---|---|---|
| 1,344,010 | Wells | June 22, 1920 |
| 1,862,143 | Hicks | June 7, 1932 |
| 1,894,862 | Grudnicki | Jan. 17, 1933 |
| 2,207,227 | Scott | July 9, 1940 |
| 2,243,012 | McMullen | May 20, 1941 |
| 2,447,059 | Eaton et al. | Aug. 17, 1948 |